United States Patent [19]

Scheckel

[11] Patent Number: 4,971,577

[45] Date of Patent: Nov. 20, 1990

[54] BOOSTER CABLE ASSEMBLY

[76] Inventor: Rose M. Scheckel, 543 W. 5th St., Ft. Wayne, Ind. 46808

[21] Appl. No.: 404,459

[22] Filed: Sep. 8, 1989

[51] Int. Cl.⁵ .......................................... H01R 11/22
[52] U.S. Cl. .............................. 439/504; 191/12.2 R; 439/13; 439/501
[58] Field of Search ................... 439/34, 35, 501, 503, 439/504; 191/12.2 R, 12.4; 435/13, 18, 20, 21

[56] References Cited

U.S. PATENT DOCUMENTS

| | | | |
|---|---|---|---|
| 3,337,695 | 8/1967 | Brown | 439/503 X |
| 4,006,952 | 2/1977 | Puckett | 439/35 X |
| 4,079,304 | 3/1978 | Brandenburg | 439/34 X |

Primary Examiner—Eugene F. Desmond
Attorney, Agent, or Firm—T. M. Gernstein

[57] ABSTRACT

A booster cable assembly includes a plurality of booster cables stored in a container unit on independent reels. The reels are controlled to automatically rewind the cables after use, and to control unwinding and rewinding so that the proper sequence of connection and disconnection will be followed during a jumping procedure.

14 Claims, 3 Drawing Sheets

BOOSTER CABLE ASSEMBLY

TECHNICAL FIELD OF THE INVENTION

The present invention relates to the general art of winding and reeling, and to the particular field of devices for storing booster cables.

BACKGROUND OF THE INVENTION

Cable devices, known as booster cables for use in supplying power to an engine having a discharged battery from a booster battery have long been employed in the automotive field to start a vehicle having a discharged battery. The specific purpose of these cables has been to obtain sufficient electrical power from one vehicle in which the engine is running to start a motor of another vehicle in which the battery has discharged. In the simplest and most common form, booster cables simply comprise a pair of heavy electrical cables in which each of the individual cables has some form of clamp or attachment means at each end so that the proper battery terminals of each vehicle may be connected. Generally, the person using such cables carries them in their vehicle at all times, usually in the trunk. The individual cables are usually ten to fifteen feet long and invariably present an annoying storage problem since the cables are not easily compacted into a neat and orderly arrangement either by winding into a series of loops or winding into a ball or simply by being compacted into a random, unwound package. Furthermore, in use, the individual cables are necessarily extended to their full length before being used regardless of the distance between the two batteries being connected.

Still further, if the cables are not stored in a neat condition, they may become tangled, and thus extremely difficult to use.

Accordingly, the art contains several examples of devices intended to maintain jumper cables in a convenient, neat stored condition. See, for example the devices disclosed in U.S. Pat. Nos. 3,853,285, 4,653,833 and 4,037,720. While all of these devices are somewhat successful in storing the cables in a neat manner, there are still problems with such devices.

One of the more important drawbacks is the lack of control in the sequence of connecting and disconnecting the cables. Since many vehicle batteries contain sulfuric acid and can be subject to explosion, care must be taken to connect jumper cables in the proper manner so as to avoid personal injury and damage to the vehicles from explosion, acid burns electrical burns or damaged electronic components.

Accordingly, there is a precise sequence with which the cables must be attached and detached, and such sequence must be strictly adhered to in order to avoid the above-mentioned consequences. This predetermined sequence includes: connecting one end of the positive cable to the positive terminal of the discharged battery and then the other end of this positive cable to the positive terminal of the booster battery, and then one end of the negative cable to the negative terminal of the booster battery and then the other end of the negative cable is connected to ground. After the engine having the discharged battery is started, the disconnection of the cables is the exact reverse of this sequence.

The inventor is not aware of any device that not only stores booster cables in a neat and organized condition, but which also assures that the proper sequences of connection and disconnection of the cables and the batteries are followed.

Therefore, there is a need for a booster cable storage assembly for storing booster cables in a neat and organized condition and which also controls the use of such booster cables in a manner that ensures the proper connection sequence as well as a proper disconnection sequence between the booster battery and the discharged battery.

OBJECTS OF THE INVENTION

It is a main object of the present invention to provide a booster cable storage assembly for storing booster cables in a neat and organized condition It is another object of the present invention to provide a booster cable storage assembly for storing booster cables in a neat and organized condition and which also controls the use of such booster cables in a manner that ensures the proper connection sequence as well as a proper disconnection sequence between the booster battery and the discharged battery.

SUMMARY OF THE INVENTION

These, and other, objects are achieved by a battery booster cable assembly that includes a container unit that stores the booster cables in a neat and organized manner, and further includes means for controlling the deployment of the booster cables according to a predetermined sequence and then controls the re-winding of such cables according to the reverse of such predetermined sequence.

The control means includes solenoids that are actuated by the opening and closing of the clamps used to connect the cables to the battery terminals as well as the presence of current in the booster circuit. The solenoids are electromagnetic types which include a rod moved from one position to another by the presence of current in the electromagnet. Various switches and current sensor elements are also included. The cables are each mounted on a reel, and the reels are mounted on an axle that can be fixed to a housing. The reels are fixably and releasably mounted on the axle. By releasing the reels from the axle, the cables can be pulled out to connect to the various elements, and then by fixing the reels to the axle, the cables can be rewound. The fixing and releasing of the reels is carried out by the solenoids and by switches, and the axle is releasable or fixable.

BRIEF DESCRIPTION OF THE DRAWING FIGURES

DETAILED DESCRIPTION OF THE PREFERRED EMBODIMENT OF THE INVENTION

Figure 1:
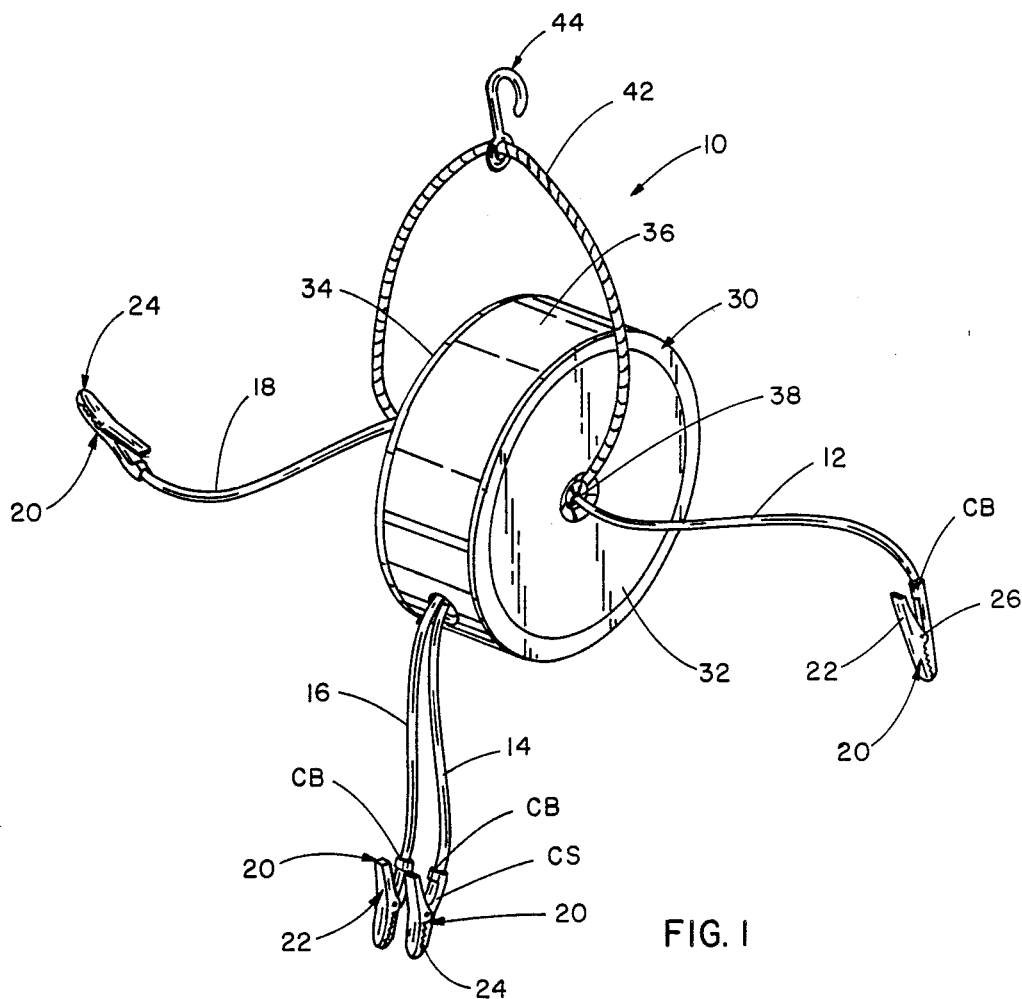
FIG. 1 is a perspective view of a battery booster cable assembly embodying the present invention.

Shown in FIG. 1 is a battery booster cable assembly 10 embodying the present invention. The assembly 10 is adapted to be attached to the hood of a vehicle, such as a car or the like, for use, and can be conveniently stored at other times.

The assembly 10 includes four booster cables 12, 14, 16, and 18, each having a clamping element 20 on one end thereof. The clamping elements include hand-operated portions 22 and tooth portions 24 which are pivotally connected together by a pivot pin 26. The clamping elements are spring loaded to be biased closed, and are attached to the terminals of the batteries or to the grounding elements to complete a circuit.

The assembly includes a hollow case 30 which is preferably formed of high impact plastic or the like, and includes a front wall 32, a rear wall 34 and a side Wall 36. The cables are stored inside the case, and cable exit openings, such as opening 38 in the front wall 32, are defined in the walls for accommodating the cables. The openings can be located in any convenient position on the case, such as adjacent to cables 14 and 16, or diametrically opposite thereto, or the like. A logo can be positioned on the case, and cutouts such as cutout CO can be defined in the case so it can be stored.

The assembly further includes a mounting portion 40 for mounting the case on a suitable support, such as the hood of a car or the like. The mounting portion includes a flexible member 42 attached to the case, and a hook 44 attached to the flexible member. The member 42 can be semi-rigid if suitable to prevent tangling, etc., and can be jointed for folding.

As shown in FIGS. 2-5, the cables are mounted on suitable reels 50, 52, 54 and 56 which are independently mounted on an axle 58 connected to the case walls 34 and 34 by pins, such as pin 60.

The cables are mounted on the reels to feed out longitudinally from reels 50 and 56 and tangentially from reels 52 and 54, in the manner of film reels such as disclosed in U.S. Pat. No. 3,780,959, the disclosure of which is incorporated herein by reference. The case has suitable guide means for controlling the winding and unwinding of the cables in the manner of such film reels as well. As the exact nature of the winding and reeling of the cables is not a part of the present invention, and such details will be known to those skilled in the winding and reeling art, such details will not be further discussed.

Figure 5:
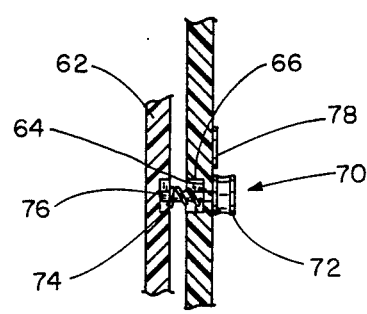
FIG. 5 is a partial elevational view of a connection between the axle and the housing of the assembly.

As shown in FIG. 5, the axle has a flange 62 on the end thereof adjacent to the case wall, and this flange has a recess 64 defined therein to co-operate with a bore 66 defined in the wall for accommodating a lock 68. The lock 68 includes a pin 70 having a head 72 that is located outside of the case wall and a spring 74 surrounding body 76 of the pin. A slide 78 is mounted on the case wall and is used to lock the pin out of the recess by being inserted between the head 72 and the wall 32.

Figure 3:
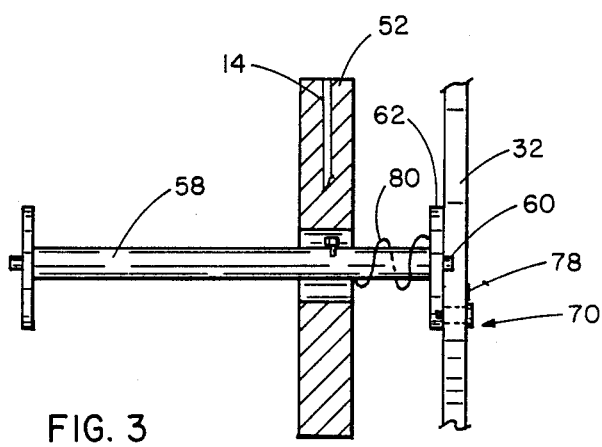
FIG. 3 is a schematic elevational view of a cable reel mounted on an axle of the assembly.

As shown in FIG. 3, the axle includes a spring 80 having one end connected to the axle and one end connected to the wall 32 to bias the axle in a selected direction when the flange 62 is freed from the wall by removing the pin 70 from the recess 64. The direction in which the axle is influence under the bias of the spring is taken as the rewinding direction.

Figure 4:
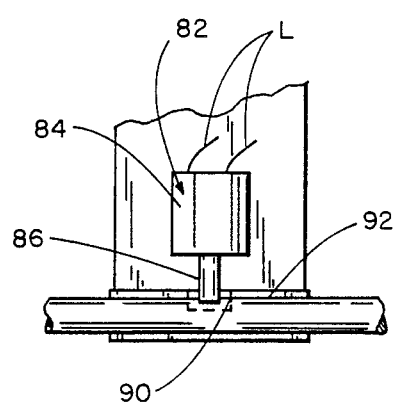
FIG. 4 is a schematic elevational view of the means for releasing and attaching the reel to the axle.

As shown in FIGS. 3 and 4, a reel, such as reel 52 is mounted on the axle to rotate with that axle when attached thereto and to freewheel about that axle when detached therefrom. The reels are attached to the axle by a lock means which includes a solenoid, such as solenoid 82. The solenoids are electromagnetic, and include a body 84 and a rod 86 that moves into the body on the application of power to the solenoid, and then moves out of the body upon re-application of power thereto. Power is applied to the solenoids via lines, such as lines L shown in FIG. 4. Those skilled in the solenoid art will understand what type of solenoids will be necessary to carry out the just-mentioned function. The axle includes a recess 90 and the rod 86 extends through a hole in hub 92 of the reel to lock the reel to the axle when the rod enters the axle recess as shown in FIG. 4. Thus, application of power to the solenoid in the FIG. 4 configuration will cause the rod 86 to retract into the body 84 and release the reel from connection to the axle thereby permitting that reel to freewheel about the axle, and such released condition will persist until power is again applied to the solenoid at which time the rod will extend out of the body and re-assume the FIG. 4 configuration locking the reel to the axle. It is noted that each cable is electrically connected to a hub 92 on which the reel containing that cable is supported. The hub for cable 12 is electrically connected to the hub for cable 16 and the hub for cable 14 is electrically connected to the hub for cable 18.

The cables in the assembly 10 can be color coded for attaching to the various elements of the system. Thus, for example, the ground cables are black and the positive cables are red. The ground cables are electrically connected together and the positive cables are also electrically connected together. Thus, the cables 12 and 16 are electrically connected together and form the ground cable in the jump circuit and thus will be colored black; whereas the cables 14 and 18 are electrically connected together and colored red to be the positive cable in the jump circuit.

Figure 6:
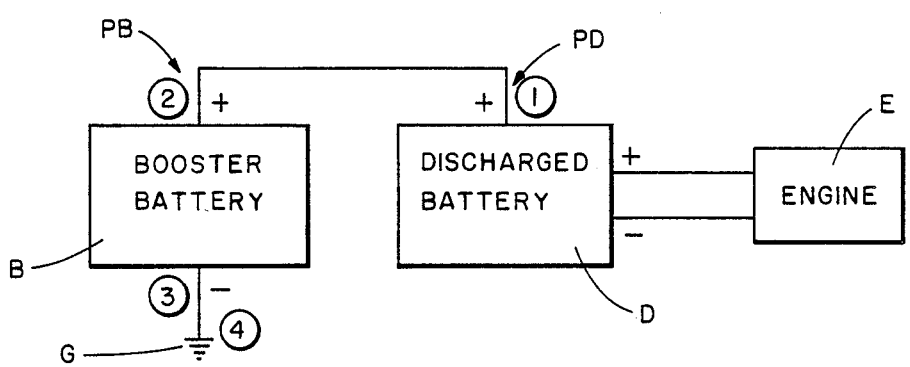
FIG. 6 is a schematic illustrating the connection of a booster battery to a discharged battery during a jumping procedure.
Figure 2:
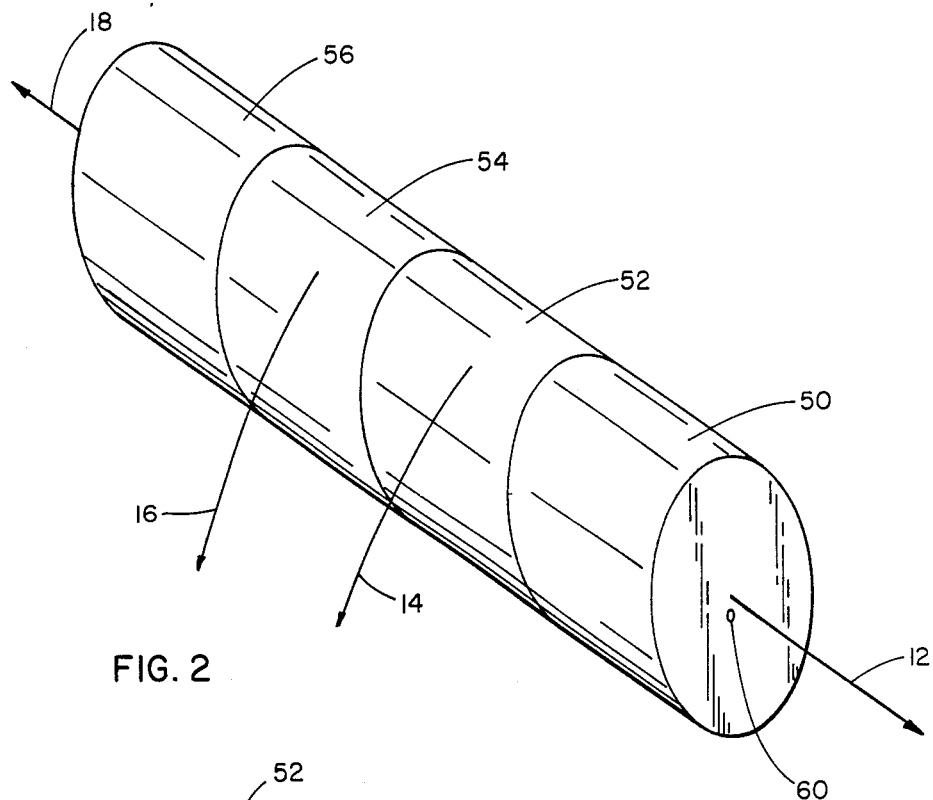
FIG. 2 is a schematic representation of the reels of the battery booster cable assembly.

As indicated above, there is a specific sequence which should be followed in attaching the cables to the booster battery and to the discharged battery if a safe jump process is to be followed. This sequence is indicated in FIG. 6 as including attaching one end of positive cable to positive terminal PD of discharged battery D as indicated at location 1 in FIG. 6, followed by connecting the other end of such positive cable to positive terminal PB of booster battery B as indicated at location 2. This is followed by attaching one end of the negative cable to negative terminal NB of the booster battery as indicated at location 3 in FIG. 6, and connecting the other end of the negative cable to a ground G as indicated at location 4 in FIG. 6. The discharged battery operates the engine E, and the booster battery can be associated with another engine if suitable. After the engine E has been jump started using the booster battery B, the cables should be disconnected in reverse order from the sequence just described. That is, terminal 4 is disconnected, followed by terminal 3, followed by terminal 2 followed by terminal 1. The terminals 1-4 represent the terminals 20 of the assembly, and the positive and negative cables are formed by the cables of the assembly which are electrically connected as discussed above.

Figure 7:
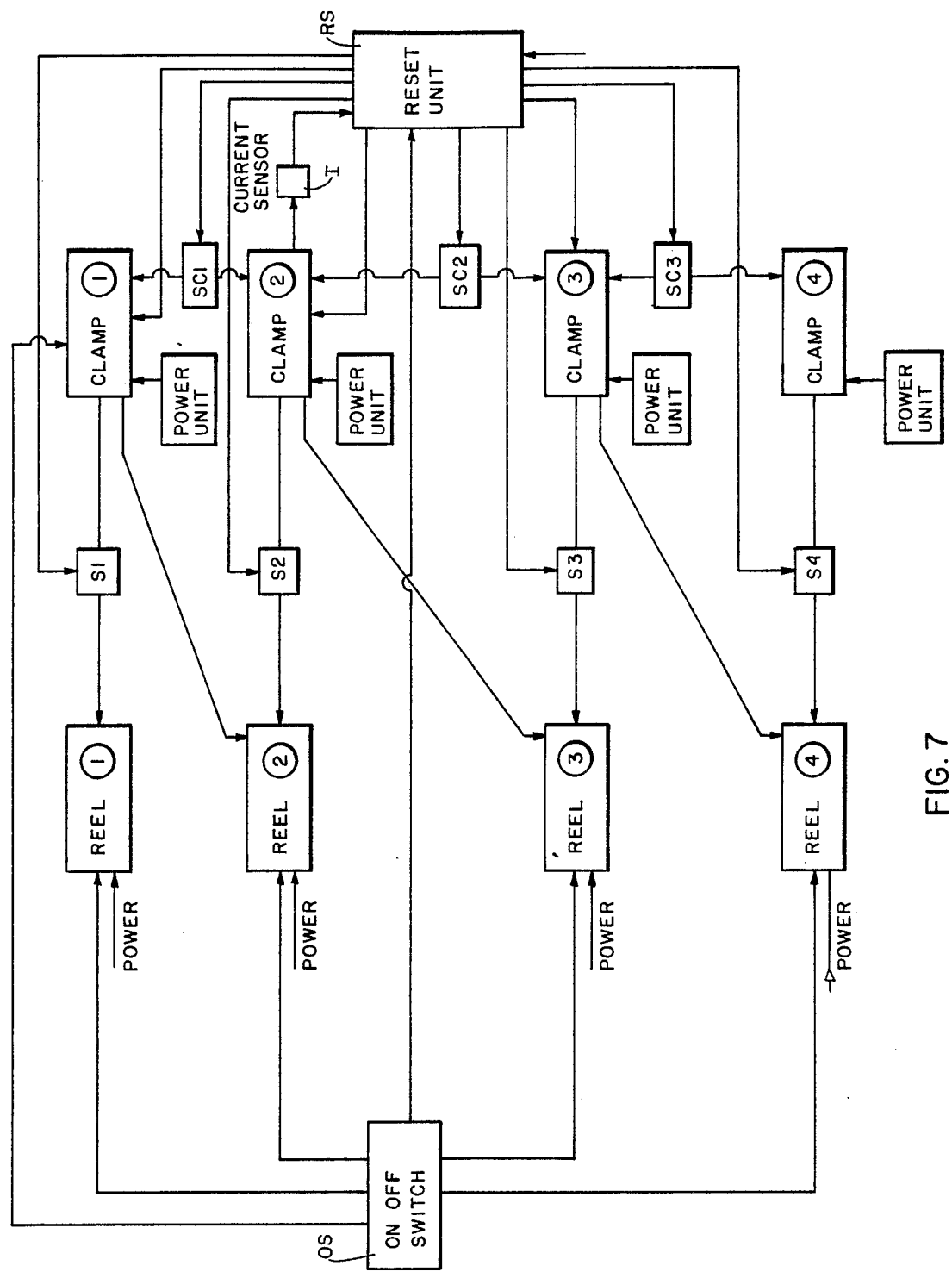
FIG. 7 is a schematic block diagram showing the jumping process of the assembly of the present invention.

The proper sequence of connection and disconnection is assured by the assembly 10 by including circuit elements shown in FIG. 7. The assembly operates to require the cables to be unwound according the connection sequence described above, and then requires the cables to be re-wound according the disconnection sequence described above. This is accomplished by signalling the solenoids to couple or decouple the various reels to the axle and to fix the axle during the unwinding process and then to permit the axle to move under the influence of spring 80 during the re-winding sequence. The signalling is accomplished using means in the clamps to signal that a clamp has been attached or detached to a terminal element. The signals are sent to the various solenoids according to whether a winding sequence is being followed or an unwinding sequence is being followed, and this is determined according to whether there is current in the positive cable connected to the positive terminal of the booster battery.

For the sake of clarity, the solenoids in the reels are shown in FIG. 7 as reel 1 to reel 4 and the clamps are correspondingly indicated as clamp 1 to clamp 4. Switches S1 to S4 control the flow of electrical signals from the clamps to the reel solenoids, and switches SC1 to SC3 control signals from one clamp to the next, with all connections being made via lines that are positioned in the cable sheaths. The signals are generated by pressing appropriate buttons, such as button CB in the clamps as shown in FIG. 1, and each of the clamps includes a solenoid, such as solenoid CS also shown in FIG. 1. The clamp solenoids are similar to the aforediscussed solenoids. Operation of a switch will transmit a signal to an associated solenoid to move the rod thereof into the position opposite to that position in which the rod located just prior to receiving the signal. That is, if the solenoid rod is extended just prior to receiving a signal, it will retract upon receiving the signal, and vice versa. Each solenoid receives power as indicated in FIG. 7 from a source that can be batteries or the like, connected to each solenoid via a line, such as line L, and the signals are transmitted in the directions shown in FIG. 7 by the arrows.

An on/off switch OS and a reset switch RS are also included to further control the operation of the system as will be discussed below. Operation of the reset switch is controlled by the presence of current in the positive cable as sensed by a current sensor I.

Operation of the circuit shown in FIG. 7 is as follows. The axle 58 is initially fixed to the case to prevent rotation thereof, the switches S1 to S4 and SC1 to SC4 are all open, and the clamp solenoids are retracted so that all of the clamps are all unlocked. Initially, the reels 4, 3 and 2 are locked to the axle to be immobile with respect to the axle (thus preventing the unwinding of the cables on such reels) and the reel 1 is unlocked from the axle (thus permitting the unwinding of the cable therefrom).

The cable on reel 1 is unwound, and clamp 1 is operated to attach that cable to the positive terminal of the discharged battery. Operation of clamp 1 signals reel 2 and releases that reel from the axle. Cable on reel 2 is unwound, and the clamp 2 is operated to attach that cable to the positive terminal of the booster battery. Operation of the clamp 2 signals reel 3 and releases such reel from the axle. The cable from reel 3 is unwound and clamp 3 is attached to the negative terminal of the booster battery. Operation of clamp 3 unlocks reel 4 from the axle, and the cable from this reel is unwound and the clamp 4 is attached to a ground. At this point in the operation, all of the reels are disconnected from the axle, and all of the connections are made.

The booster battery is operated, as by starting the engine associated therewith, and current appears in the positive cable. This current is sensed by the current sensor I and the reset unit RS is operated. The reset unit signals the switches S1 - S4 and SC1 -SC4 to close those switches, and reels 3, 2 and 1 to re-lock those reels to the axle.

At this point in the sequence, only reel 4 is connected to the axle. The axle is unlocked from the case using the manual release 72 as above described, and the spring 80 begins to bias the axle in the rewind direction. However, all of the reels are disconnected from the axle, so no rewinding occurs.

The cables are disconnected in reverse order of connection, and thus, cable 4 is disconnected first. The clamp 4 is opened, and this sends a signal to reel 4 and to clamp 3 which locks reel 4 to the axle and frees clamp 3. The released cable 4 is wound onto the reel 4 by the movement of the axle until the cable is fully wound up at which time the clamp contacts the case and stops the rewinding motion of the axle.

The clamp 3 is released from the negative terminal of the booster battery which sends a signal to clamp 2 and to reels 3 and 4 which unlocks clamp 2 and locks reel 3 to the axle while unlocking reel 4 from the axle. The only reel connected to the axle is now reel 3, and the only clamps free are clamps 2, 3 and 4. The cable is wound onto reel 3 in a manner similar to the winding of cable 4 just described.

The clamp 2 is then released from the positive terminal of the booster battery, and this sends a signal to reels 2 and 3 and to clamp 1 to release clamp 1, release reel 2 from the axle and lock reel 3 to the axle. The only reel locked to the axle is reel 2 and all of the clamps are free. Reel 2 is permitted to rotated with the axle to wind the cable onto such reel.

Clamp 1 is next operated to release it from the positive terminal of the discharged battery, and this sends a signal to reels 1 and 2 to lock reel 1 to the axle and to release reel 2 from the axle. Reel 1 is then rewound. At this time, only reel 1 is locked to the axle, all of the clamps are free and all of the switches are closed.

The axle is manually connected to the case to immobilize it, and the on/off switch is operated to reset all switches into the open position and to send a signal to all of the reel solenoids. This causes reels 2, 3 and 4 to lock to the axle, and reel 1 to be freed of the axle. The on/off switch can be connected to the power source to disconnect the circuits from that power source to conserve such source if suitable. The system is thus returned to the initial setting mentioned above, and the cycle can be repeated for the next jump start process.

If desirable, the switches SC1 - SC4 can be set up so the clamps must be opened in sequence during the connection phase as well. Thus, the switches are set up and the clamps configured so that at initial set up, only clamp 1 is free while clamps 2, 3 and 4 are locked and prevented from opening. Then operation of clamp 1 frees clamp 2, operation of clamp 2 frees clamp 3 and operation of clamp 3 frees clamp 4. At engine start, the reset unit will lock clamps 1, 2 and 3 as above discussed while leaving clamp 4 free to begin the disconnection and rewinding phase of the process.

The switches, relays, reset unit and other circuit elements are not specifically discussed as they are not per se part of the invention, and a circuit designer will understand what elements must be used and in what design they must be connected to accomplish the above-stated functions.

It is understood that while certain forms of the present invention have been illustrated and described herein, it is not to be limited to the specific forms or arrangements of parts described and shown.

I claim:

1. A booster cable assembly for connecting a booster battery to an engine having a discharged battery to start that engine, comprising:
    (A) four booster cables which include
        (1) two electrically connected negative cables,
        (2) two electrically connected positive cables, and
        (3) releasable electrical couplings on each cable for electrically coupling each cable to an appropriate element in the booster battery, the discharged battery and ground; and
    (B) a container unit for storing and dispensing said booster cables, including
        (1) a hollow case having a front wall, a rear wall and a side wall,
        (2) hook means attached to said case for releasably mounting said case to a support,
        (3) a plurality of independent reels with each reel containing one of said cables,
        (4) an axle mounted in said case on which said reels are mounted,
        (5) exit openings defined in said case front wall, said case rear wall and said case side wall respectively, with one of said cables extending through one of said exit openings, and
        (6) reel control means connected to said reels for controlling movement of said cables onto and off of said reels.

2. The booster cable assembly defined in claim 1 wherein said container unit includes rewind means for automatically rewinding said cables onto said reels.

3. The booster cable assembly defined in claim 2 wherein said rewind means includes a spring connected to said axle to bias said axle in a reel rewinding direction.

4. The booster cable assembly defined in claim 3 wherein said rewind means includes a release means on said case and which is movable from a first position connecting said axle to said case to prevent said spring from moving said axle in the reel rewinding direction to a second position freeing said axle from said case to move under the influence of said spring in a reel rewinding direction.

5. The booster cable assembly defined in claim 4 wherein said reel control means includes locking means for locking each reel to said axle for rotation therewith and for releasing each reel from said axle so that a released reel can rotate with respect to said axle.

6. The booster cable assembly defined in claim 5 wherein said reel control means includes unwind sequence means which requires said reels to be unwound in a prescribed unwind sequence.

7. The booster cable assembly defined in claim 6 wherein said control means further includes rewind control means which requires said reels to be re-wound in a prescribed rewind sequence.

8. The booster cable assembly defined in claim 7 wherein said locking means includes a solenoid mechanism on each reel.

9. The booster cable assembly defined in claim 8 wherein said control means further includes a control switch on each cable coupling.

10. The booster cable assembly defined in claim 9 wherein said control means further includes a current sensor connected to one of said cables.

11. The booster cable assembly defined in claim 10 wherein each control switch is connected to the solenoid mechanism associated with that cable and to a next solenoid in said unwind and said rewind sequences.

12. The booster cable assembly defined in claim 11 wherein each cable coupling further includes a locking means.

13. The booster cable assembly defined in claim 12 wherein each cable coupling locking means includes a solenoid mechanism.

14. The booster cable assembly defined in claim 13 further including connecting means connecting said cable coupling solenoids together so that such cable couplings are unlocked in a prescribed sequence during said rewind sequence.

* * * * *